United States Patent [19]

Hedrick

[11] Patent Number: 5,289,861
[45] Date of Patent: Mar. 1, 1994

[54] MULTI-PURPOSE QUICK-CHANGE WORK SURFACE PLATFORM FOR USE WITH POWER TOOLS

[76] Inventor: David G. Hedrick, 3636 Penn Ave., N., Minneapolis, Minn. 55412

[21] Appl. No.: 855,233

[22] Filed: Mar. 23, 1992

[51] Int. Cl.⁵ .............................................. B27C 5/02
[52] U.S. Cl. .................... 144/134 A; 144/1 F; 144/134 R; 144/136 R; 144/82; 144/83
[58] Field of Search ................ 144/82, 83, 84, 134 R, 144/134 A, 134 D, 136 R, 136 C, 253 R, 253 J, 1 E, 1 F

[56] References Cited

U.S. PATENT DOCUMENTS

| | | | |
|---|---|---|---|
| 4,679,606 | 7/1987 | Bassett | 144/134 A |
| 5,004,027 | 4/1991 | Legler et al. | 144/371 |
| 5,025,841 | 6/1991 | Totten | 144/82 |
| 5,117,879 | 1/1992 | Payne | 144/134 D |

Primary Examiner—W. Donald Bray

[57] ABSTRACT

A multi-purpose quick-change work surface platform for use with power tools which are secured by means of a unique interlocking mount and dismount system and used in conjunction with various size and types of cutting, routing, sanding, and shaping bits or tools. The work surface platform is designed to receive various workpiece guides, attachments, fences, biscuit joiner, template guide bushings, and other shopbuilt attachments or jigs which are attached or conveyed through means of various recessed threaded insert holes and guide grooves.

15 Claims, 4 Drawing Sheets

MULTI-PURPOSE QUICK-CHANGE WORK SURFACE PLATFORM FOR USE WITH POWER TOOLS

BACKGROUND

1. Field of Invention

This invention relates to woodworking and machine tools, particularly to shaping and cuttings tools such as routers and router attachments, guides, tables, and jigs.

2. Description of Prior Art

Heretofore, router tables necessitated either the affixing of a router to the underside of the router table or to a router base plate which either sat in or attached to an opening in the router table. This would thereby incapacitate the affixed router for any other usage unless the router was disengaged from such router table and/or base plate and reattached either to its original base plate or to another base plate depending on its usage. In addition, once the router was attached to its table, bit changing and router speed and height adjustment were cumbersome and difficult. Also, designers, and particularly manufacturers, in their attempt to design or produce a router table which would adapt to all brands of routers, have of necessity sacrificed the simpler, better, and more secure attaching devices for use with a specific brand of router in favor of universal mounting attachments, brackets, or clamps. This in turn often made attaching of the router more difficult and alignment less precise. Furthermore, the bit protrusion hole in the table top or base plate is usually small, not more than 1¼" in diameter, thereby limiting usage to only those smaller cutting and shaping bits which would fit within the parameters of such hole. Also, the bit protrusion hole is usually not adaptable for any available template guide bushing which normally requires the detachment of the router from the table or base plate and the affixing of a base plate which is specifically designed to accept such template guide bushing. Most router tables, also, are either constructed with a less ridged structural design or of such material as to limit their usage to the lighter weight and smaller horsepower routers thereby not conducive to the attachment of the heavier weight and higher horsepower routers without severely sacrificing the cutting ability and precision of cut. Those tables of superior structural strength and design are either designed specifically for a particular brand of router, are designed so that the router is affixed in such a way as to incapacitate the router for other usage, are designed for specific singular or limited usage, or are designed to attach to other work surfaces such as a table saw. Furthermore, all router tables are stationery and are used by passing a workpiece across the table surface as opposed to passing the table surface across the workpiece. In addition, router tables have not been designed to accept attachments for biscuit, box or dovetail joinery. There is on the market a biscuit joiner router attachment, U.S. Pat. No. 4,942,912. But this attachment requires the removal of the router base plate and the affixing of the biscuit joiner attachment for its usage and then the detachment of the device and reattachment of the router base plate in order to use the router for other applications. Lastly, router tables themselves, by nature of their design, whether commercially available or shop built, require their own space in one's workshop and are essentially of no value for other usage.

OBJECTS AND ADVANTAGES

Accordingly, the objects and advantages of this invention are to provide a quick change mount and dismount router table system through the use of a unique interlocking router base plate and table platform and wherein the router, with its attached quick change base plate, can be used either independently of or interlocked with the router table platform. Also, with the quick change base plate and table platform interlocked together, the unit can be used either by itself without any other table support system or can be used in a larger router table set into a premachined opening in its top surface.

A further object is to provide a router table adaptable to almost any commercially available router and with the rigidity to support routers of the heavier and higher horsepower type yet compact and light enough for ease of portability, operation, and storage.

Another object is to provide a quick change interlocking clear see-through insert which can snap into the center of the quick change router base plate for the purpose of providing clear sight for ease of bit changing; for providing clear sight of workpiece when using the router in the upright position and passing it over the workpiece; for providing a means of alternative size bit protruding holes to use with the various size router bits to include the larger raised panel bits; and for providing a bit protrusion hole designed to accept universal commercially available template guide bushings.

Another object is to provide a table platform which, when interlocked with the base plate and router, can be used with the router in an upright position, thus providing a larger base plate surface for greater stability and, when used with a guide fence, provides for precise measured routing or grooving.

Another object is to provide a table platform surface designed to receive various workpiece guides and attachments to include a workpiece guide carriage for conveying a workpiece across the table surface and against a router bit; a multi-adjustable guide fence which adjusts for depth of cut, size of cutting or shaping bit, and the attachment of protective guard or saw dust vacuum system; a biscuit joining attachment; and other easily attachable shopbuilt workpiece guides and jigs.

In summary, the objects and advantages of this invention is to provide in one system a device to accomplish a minimum of seven separate routing or shaping functions with ease and simplicity of operation which would heretofore necessitate the purchase of separate independent tools or the affixing of separate attachments or tools.

Further objects and advantages of my invention will become apparent from consideration of the drawings and ensuing description of it.

LIST OF REFERENCE NUMERALS

Figure 1:
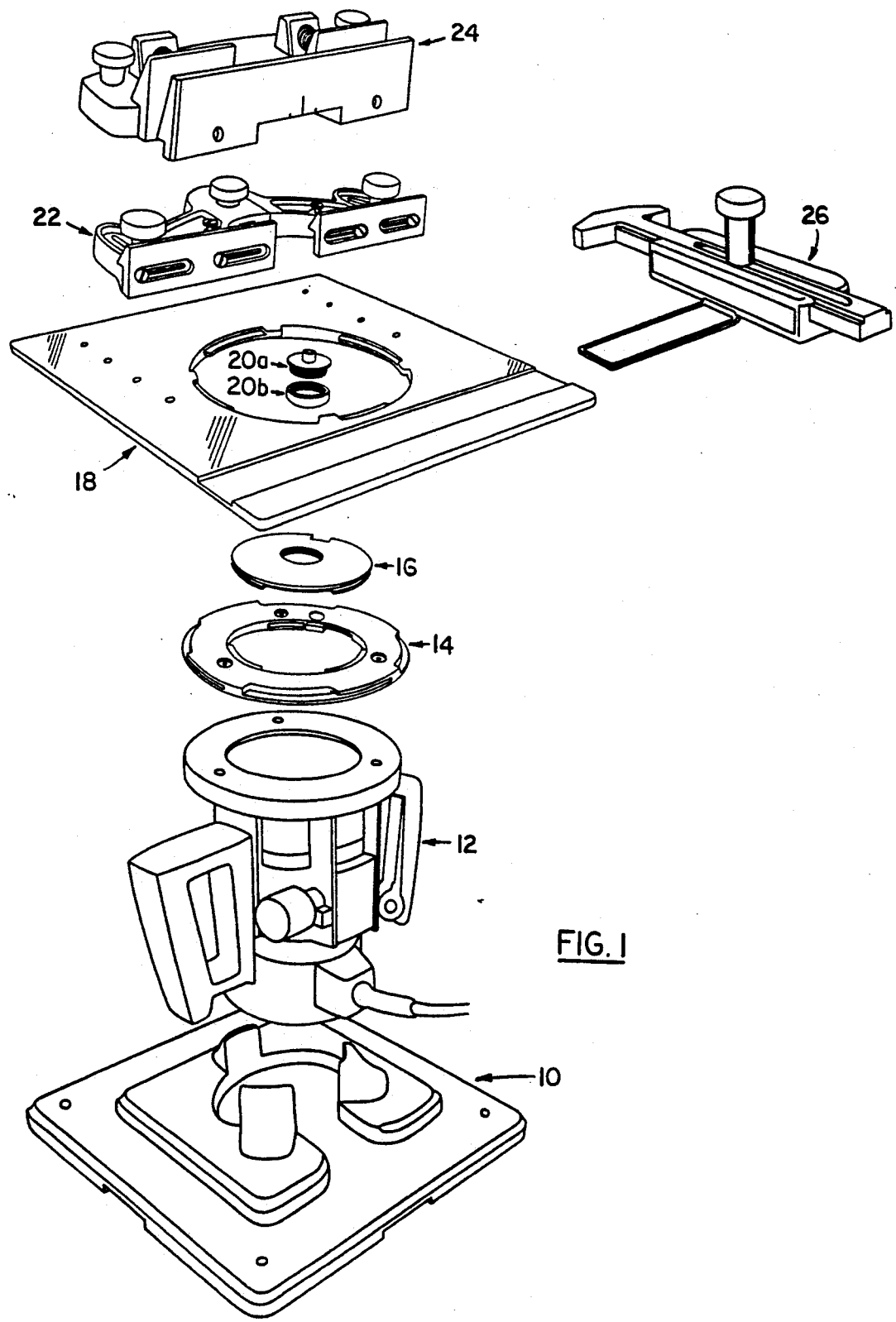
FIG. 1 is an exploded view of the entire quick-change multi-purpose router table unit with attachments, guides, and router showing one type of router support mechanism.

10. Router base vertical support unit.
11. Router base vertical support unit bolt securing holes.
12. Router unit.
14. Quick-change router base plate.
16. Quick-change router base plate center insert plate.
18. Quick-change router table platform.
20. Template guide bushing and locking nut.
21. Template guide bushing top surface.
22. Multi-adjustable split guide fence.
24. Biscuit joiner attachment unit.
26. Workpiece slide guide.
28. Workpiece slide guide slide groove.
29. Quick-change router table platform top surface.
30. Quick-change router table platform mounting support tabs.
31. Quick-change router table platform mounting support tab stops.
32. Quick-change router table platform threaded screw attachment receptacles.
33. Quick-change router table platform center base plate mounting opening.
34. Quick-change router base plate recessed mounting receptacle opening.
35. Quick-change router base plate outside perimeter guide rim.
36. Quick-change router base plate slotted mounting support tab receptacle.
37. Quick-change router base plate top surface.
38. Quick-change router base plate recessed attachment screw holes.
39. Quick-change router base plate center insert mounting opening.
40. Receptacle hole for #44 router base plate center insert lock/release tab button.
41. Quick-change router base plate center insert lock/release tab recessed underside receptacle cavity.
42. Quick-change router base plate center insert lock/release tab.
43. Quick-change router base plate center insert lock/release tab attachment hole.
44. Quick-change router base plate center insert lock/release tab release button.
45. Mounting rivet for lock/release tab.
46. Quick-change router base plate center insert lock/release tab catch.
47. Quick-change router base plate center insert recessed mounting receptacle opening.
48. Quick-change router base plate center insert mounting support tabs.
49. Quick-change router base plate center insert top surface.
50. Quick-change router base plate center insert bit protrusion and template guide bushing receptacle hole.
51. Quick-change router base plate center insert template guide bushing receptacle support ridge.
52. Quick-change router base plate center insert slotted mounting support tab receptacle groove.
54. Quick-change router base plate center insert lock/release tab catch slot.
56. Workpiece slide guide slide bar.
58. Self sticking anti-slide rough coated membrane.
60. Workpiece slide guide base member.
61. Workpiece slide guide base member frontal guide surface.
62. Workpiece slide guide adjustment slide bar.
64. Workpiece slide guide adjustment slide bar adjustment slot.
66. Workpiece slide guide adjustment slide bar tightening turn knob and threaded bolt.
68. Workpiece slide guide adjustment slide bar end stop.
70. Workpiece slide guide base member slide bar receptacle slot cavity.
72. Multi-adjustable split fence right and left base members.
73. Multi-adjustable split fence right and left base members front surface.
74. Multi-adjustable split fence right and left laterally adjustable front workpiece guide plates.
75. Multi-adjustable split fence recessed bit clearance cavity.
76. Multi-adjustable split fence front workpiece guide plate adjustment screw receptacle groove.
77. Multi-adjustable split fence front workpiece guide plate adjustment screw receptacle groove slots.
78. Tightening screws for workpiece guide plates.
79. Multi-adjustable split fence front workpiece guide plate front surface.
80. Threaded screw receptacles for receiving #78 tightening screws.
82. Threaded screw receptacle for receiving #90c tightening turn knob bolt.
84. Multi-adjustable split fence right and left interlocking tab and slot slip joints.
86. Multi-adjustable split fence right and left base member adjusting position slot for receiving #90a and 90b tightening turn knob bolts.
88. Multi-adjustable split fence right member adjusting position slot for receiving #90c tightening turn knob bolt.
90. Multi-adjustable split fence right, left, and center adjusting position tightening turn knob and threaded bolt.
92. Attaching crews for optional protector shield or saw dust vacuum system (not shown).
94. Biscuit joiner attachment unit base member.
96. Biscuit joiner front plate sliding guide plate.
98. Biscuit joiner front plate workpiece guide.
99. Biscuit joiner front plate cavity opening.
100. Biscuit joiner right and left adjusting bolt receptacle and sliding guide cylinders.
101. Biscuit joiner front plate sliding guide plate recessed bit protrusion cavity.
102. Biscuit joiner adjusting bolt tension springs.
104. Biscuit joiner base member right and left vertical guide plates.
106. Biscuit joiner right and left vertical guide plate guide holes.

107. Biscuit joiner base member center bit protrusion recessed cavity.
108. Biscuit joiner base member guide slot cavity for sliding guide plate.
110. Biscuit joiner base member biscuit size adjustment slot.
112. Biscuit joiner base member right and left vertical support appendages.
114. Biscuit joiner right and left vertical support appendages receptacle holes.
116. Tension adjusting bolts.
118. Right and left biscuit joiner tightening turn knob and threaded bolt.
120. Biscuit joiner threaded cylinder insert.
122. Biscuit joiner front plate workpiece plate slotting alignment marks.
124. Biscuit joiner front plate depth adjustment screws.

DESCRIPTION OF PREFERRED EMBODIMENT

In FIG. 1 of the drawings, the router base vertical support unit 10 secures a router 12 in an inverted vertical position. The router based support unit 10 is secured to a stationery surface by means of either clamping or bolting (clamps and bolts not shown). The base provides bolt holes 11 through which securing bolts can be affixed.

Figure 2:
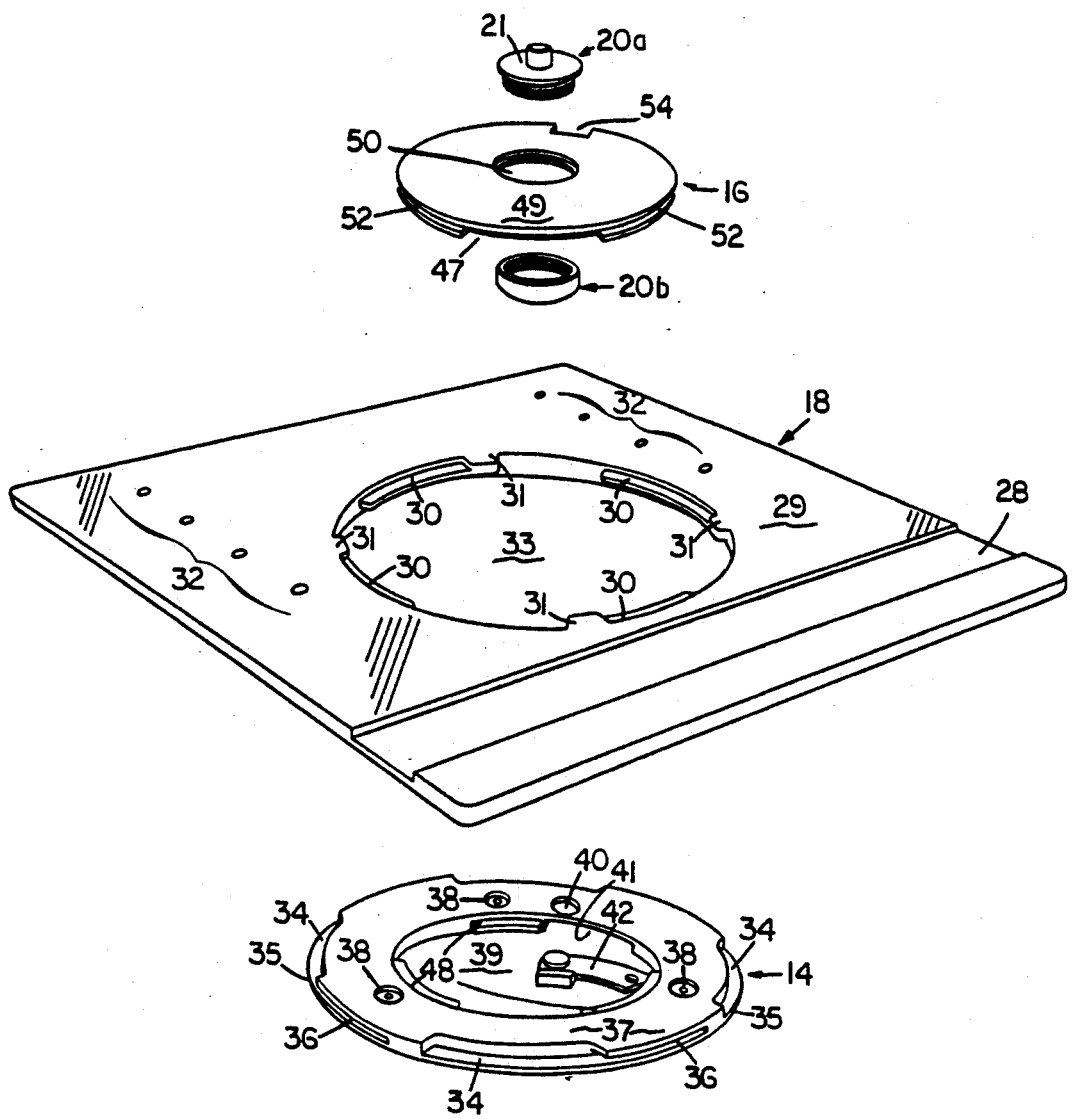
FIG. 2 is an exploded view of the quick-change router table platform and router base plate with center insert and template guide busing and nut.

The quick-change router or tool base plate 14, preferably molded of impact plastic styrene, and shown in detail in FIG. 2, is mounted to the router by means of attaching screws (not shown) supplied with original stock router based plate and secured through the recessed based plate attachment screw holes 38. Once the base plate is secured to the router it need never be removed. The base plate is designed so as to provide an outside perimeter guide rim 35 which encompasses the total circumference of the plate. Space around and into the perimeter edge surface of the base plate and above the guide rim 35 are recepticle slots 36 which are recessed a sufficient amount and which opening is of sufficient width so as to receive the quick-change table platform mounting support tabs 30. The recessed mounting receptacle opening cutouts 34 are designed to be equal in dimension to the depth, breadth, and width of the quick-change table platform mounting support tabs 30 so that the base plate can slip up under and mount onto the mounting support tabs 30 when the quick-change base plate with attached router is turned in a clockwise direction. When the quick-change base plate and table platform are interlocked in this position, the top surface of both the base plate 37 and the table platform 29 are on an equal plane.

In the center of the quick-change base plate is an opening area 39 which is of sufficient size as to allow the protrusion above and below the surface plane of shaping and routing bits (not shown) up to a diameter of 3½ inches. Protruding into the opening area 30 from around its periphery and parallel to the base plate surface 37 are male mounting support tabs 48 which are equal in breadth to the spaces that seperate them. Located on the underside of the base plate and attached to it is a lock/release tab 42, also shown in FIG. 4, which has a stop catch 46 which protrudes vertically from the tab and horizontally into the center opening 39. This lock/release tab is fitted into the base plate in a recessed cavity 41 on the underside of the base plate the shape of which cavity is the same as the shape of the lock/release tab 42. This lock/release tab is secured to the base plate by means of a rivet 45 attached through the hole 43, preferably heat or ultrasonically seated, so that when pressure is applied to the lock/release button 44, seated in the lock/release button receptacle hole 40, the tab with catch bends downward.

The quick-change table platform 18, shown in FIG. 1 and in detail in FIG. 2, is constructed of such material, either aluminum or foamed plastic styrene, and with sufficient underside support so as to give it the structural rigidity capable of supporting the various commercial routers available when suspended from it. The surface dimension is such as to encompass a center platform opening 33 for mounting the base plate 14 and a workpiece slide guide slide groove 28 and be able to accommodate the attachments 22 and 24 shown in FIGS. 1, 6, and 7. The table platform center mounting opening 33 is of equal diameter as that of the base plate and has protruding from the periphery of the opening male mounting support tabs 30 into the opening and parallel with the platform work surface 29. The dimension of the mounting support tabs 30 are equal in breadth to the spaces which separate them while the width and the depth is equal in size to the width and depth of the base plate receptacle slots 36. At the left end of each mounting support tab is a raised nodule or end stop 31 the top of which is on equal plane with the table platform work surface and against which the base plate stops when mounted upon the mounting support tabs 30. Traversing the table platform work surface outside the periphery of the center mounting opening 33, extending from one side to the opposite and parallel to the adjoining sides is a workpiece slide guide slide groove 28. The depth and width of this slide groove is equal to the thickness and width of the workpiece slide guide slide bar 45 shown in FIG. 5. Also recessed into the table platform work surface 29 are equally spaced threaded receptacle holes 32 which are located outside the periphery of the platform center mounting opening 33 and on a plan parallel to the table sides that are perpendicular in relation to the slide bar groove 28.

Figures 3, 4:
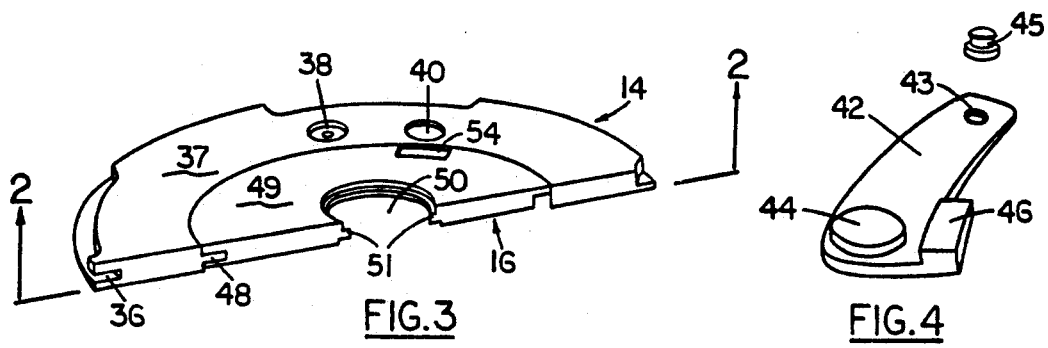
FIG. 3 is a cross-sectional view of FIG. 2 quick-change router base plate with center insert in fixed mounted position.
FIG. 4 is an end perspective of the base plate center insert lock/release tab and mounting rivet.

The base plate center insert plate 16, shown in FIGS. 1 and 2, and in FIG. 3 as a cross-sectional view in mounted position with the base plate, is preferably molded of clear impact plastic styrene, and is equal in diameter to the base plate center insert mounting hole 39. The center insert plate is designed with a recepticle slot 52 which encircles the entire circumference of the insert plate perimeter edge surface with the dimension of such slot equal in depth and width to the depth and thickness of the base plate center insert mounting support tabs 48. The center insert plate recessed mounting receptacles opening cutouts 47 (only one shown) are designed to be equal in number and in dimension with the depth, breadth, and width of the base plate center insert mounting support tabs 48 so that the center insert plate can set down upon and mount onto the mounting support tabs 48 when turned in a clockwise direction. When the center insert plate and the base plate are mounted together as shown in the cross-sectional view of FIG. 3, the center insert plate work surface 49 and the base plate work surface 37 are on an equal plane. The center insert plate is also designed with a center bit protrusion hole 50 through which a router bit protrudes above and below the surface plane. The diameter of the bit protrusion hole is such as to allow the insertion of a universal template guide bushing 20a and is designed with an inside template guide bushing mounting ridge 51 which encircles the inside periphery of the bit hole and upon which the template guide bushing sets when secured in place by means of an opposing locking nut 20b. When the template guide bushing is locked onto the center insert plate the surface of the template guide bushing 49 is on equal plate with the work surface of the center insert plate 37. Also designed into the center insert plate on the outside edge of the work surface is a lock/release tab catch slot 54 which is of such size and shape as to receive the lock/release tab catch 46 which is engaged when the center insert plate is mounted onto the router base plate as shown in FIG. 3.

Figure 5:
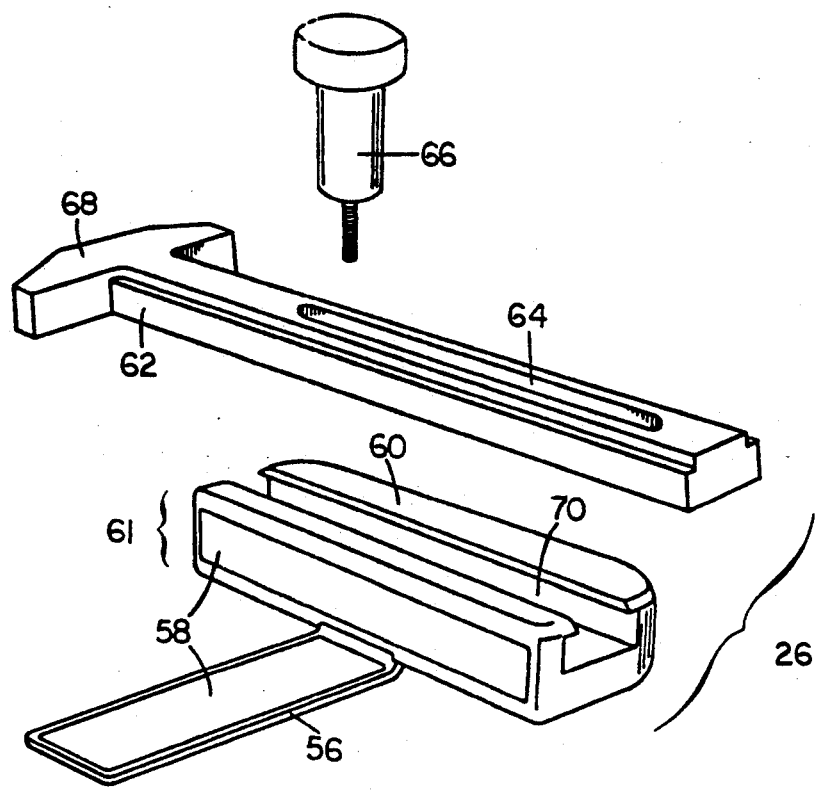
FIG. 5 is an exploded view of the workpiece sliding guide.

The workpiece slide guide 26 shown in FIG. 1 and in detail in FIG. 5, is comprised of four elements. The guide base member 60 is of sufficient length, breadth, and width as to be able to guide a workpiece across the table platform work surface and against a routing or shaping bit when a workpiece is held against the guide. The frontal guide surface area 61 projects 90 both in a vertical and planar relation to the guide slide bar 56. The slide bar 56 is equal in width and thickness to the width and depth of the table platform workpiece slide guide slide groove 28 and is of sufficient length to give stability to the slide guide member as it traverses the table surface. Affixed to the top surface of the slide bar 56 and the frontal guide surface 61 is an anti-slide rough coated surface membrane 58. Traversing the length of the guide base member and projecting downward into the guide base is a slide bar receptacle slot cavity 70 of such width and depth so as to receive the elongated guide adjustment slide bar 62. At the end of the guide adjustment slide bar is a "T" shaped end stop 68 against which a workpiece rests when being conveyed across the table platform surface. Along the length and vertically through the center of the adjustment slide bar is an elongated adjustment slot 64 through which passes the tightening knob threaded bolt 66 which is received into a threaded receptacle (not shown) located in the bottom of the base member slide bar receptacle slot cavity 70.

Figure 6:
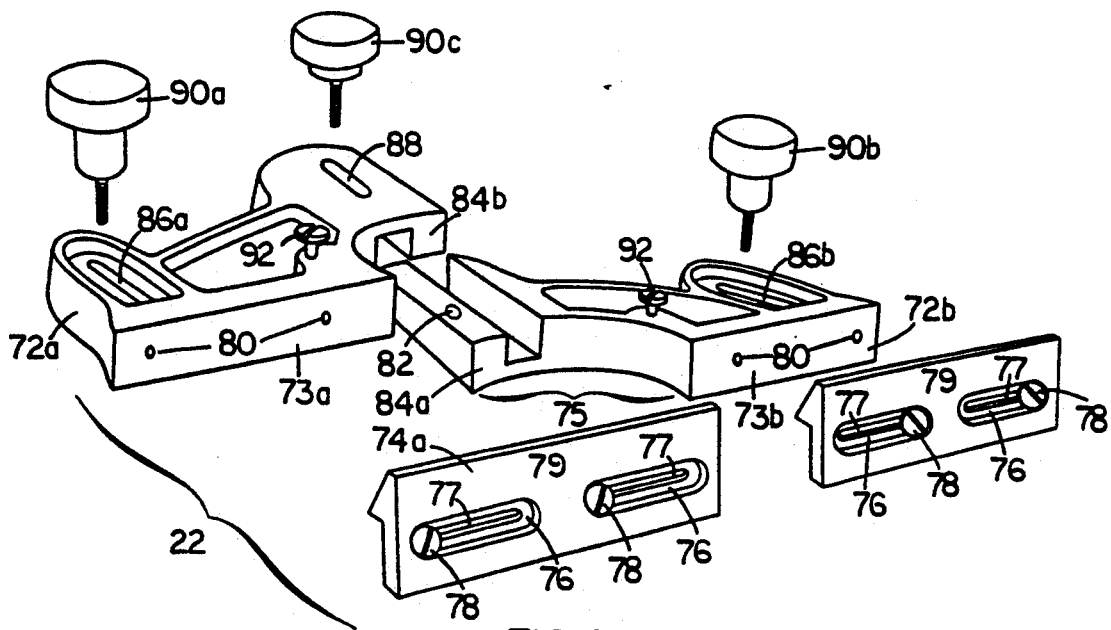
FIG. 6 is an exploded view of the multi-adjustable split guide fence.

The multi-adjustable split guide fence 22 is shown in FIG. 1 and in detail in FIG. 6. The adjustable base members 72a and 72b are identical pieces with one turned in opposite position from the other and coupled together by means of an interlocking tab and slot slip joint 84a and 84b. The coupled base members are secured by means of a tightening bolt and turn knob 90c, which bolt passes through an adjustable positioning slot 88 located in the top surface of the left base member 72a which overlaps the other base member 72b at the tab and slot slip joint location and which bolt is received into a threaded receptacle 82 located in the overlapped joint tab of base member 72b. The coupled base member unit creates a devise which, when attached to the quick-change table platform work surface, is of sufficient length to guide a workpiece as it is conveyed across the table work surface and against the shaping or routing bit. The front surface area of the base members 73a and 73b is 90 in relation to the top and bottom surfaces of the base members. The center portion of the coupled unit creates a recessed bit clearance cavity 75 which separates the front surfaces 73a from 73b. The radius of the recessed cavity is equal to the radius of the base plate center insert mounting opening 39. At each end of the coupled base member unit are located elongated slots 86a and 86b which are perpendicular in relation to the base member front surface area. The distance between the end slots is equal to the distance between the right and left side threaded screw attachment receptacle holes 32 located in the quick-change table platform work surface 31. These slots extend through the base members from top to bottom surfaces. Through these slots extend the tightening bolts with turn knobs 90a and 90b. In each base member top surface, at the perimeter of the center bit clearance cavity, are located attaching screws 92 which are provided for securing of optional protector shield (not shown) and saw dust vacuum system attachment (not shown).

Attached to the front surface 73a and 73b of each base member are laterally adjustable front workpiece guide plates 74a and 74b. Each guide plate has a flat front surface 79 which extends vertically upward beyond the top surface of and at a 90 relation to the base member. The length of each guide plate is such that they extend beyond the length of each base member front surface 73a and 73b but limited to a distance of 1¼" on either end. Recessed into the flat front surface of each guide plate 79 are elongated horizontal grooves 76, through the center of which are located elongated slots 77 which traverse the length of each groove. The guide plates are secured to the base members by means of tightening screws 78 which pass through the groove slots and are received into the threaded receptacles 80 which are located in the base member front surface. The width and depth of each guide plate groove is sufficient as to allow the head of the tightening screws to recess into the groove and below the front surface of the guide plate.

Figure 7:
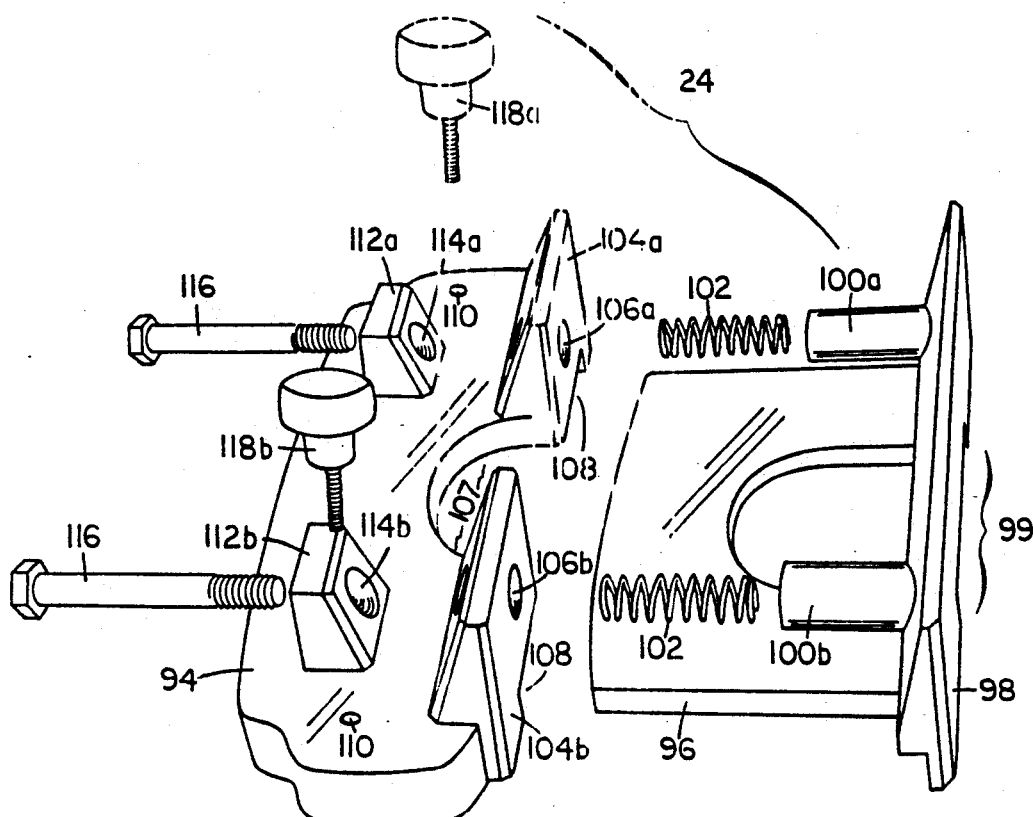
FIG. 7 is an exploded view of the biscuit joiner attachment unit.
Figure 8:
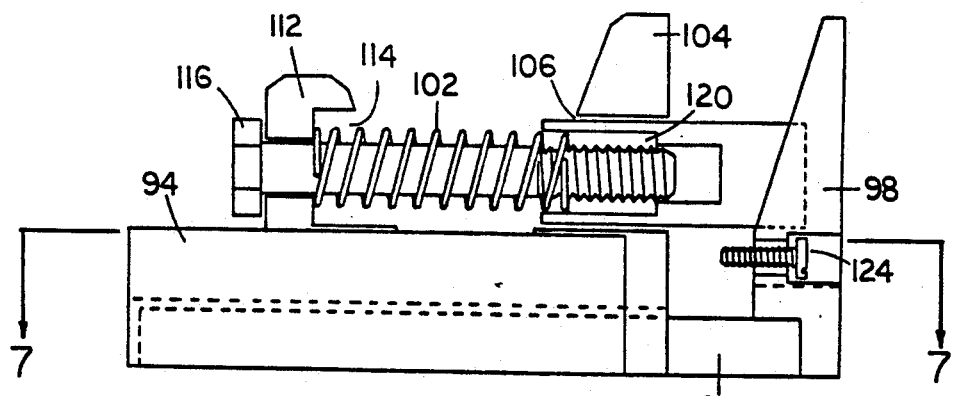
FIG. 8 is a cross-sectional view of the assembled biscuit joiner attachment unit of FIG. 7.
Figure 9:
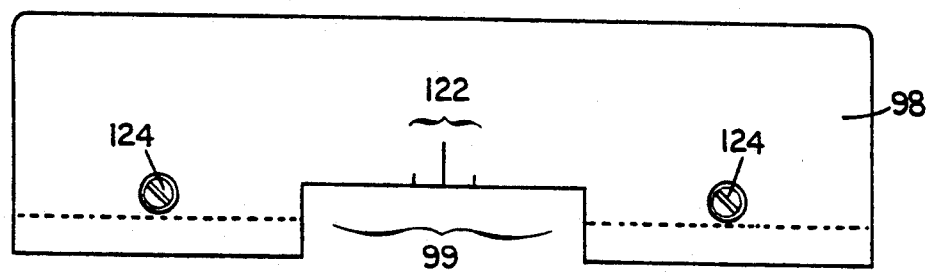
FIG. 9 is a frontal view of the biscuit joiner front guide plate.

The biscuit joiner attachment unit 24 of FIG. 1 is shown in detail in FIG. 7, in a cross-sectional view in FIG. 8, and in frontal view in FIG. 9. The base member unit 94 shown in FIGS. 7 and 8 is designed to attach to the quick-change table platform work surface by means of tightening bolts with turn knobs 118a and 118b which pass through the biscuit joiner securing holes 110 located at opposite ends of the base member unit. The bolts are received into the quick-change table platform work surface threaded screw attachment receptacle holes 32. Recessed into the front plate at opposite ends and in perpendicular relation to the front vertical surface are depth adjustment screws 124. These screws pass through the front plate and extend beyond the rear surface and are used to stop the travel of the inward movement of the front plate at a preset depth. On the front surface of the front guide plate, centered just above the cavity opening 99, are located three vertical alignment marks 122. These marks are separated at ¼ inch distance and are used to align a workpiece at a precise spot to ensure an accurate cut. Located at the front of the base member unit and projecting vertically upward 90 are right and left guide plates or appendages 104a and 104b, through which project guide holes or recepticles 106a and 106b at a 90 relation to the front vertical surface. These guide holes or recepticles receive the right and left adjusting bolt receptacle sliding guide cylinders 100a and 100b which are attached to the biscuit joiner workpiece front guide surface 98. The diameter of the guide holes 106a and 106b are slightly larger than the outside diameter of the guide cylinders 100a and 100b. The front guide surface 98 is attached to a sliding guide member 96 which slips into a cavity 108 located in the underside of the base member unit 94. This cavity is slightly larger in width, depth and height than the width, length and thickness of the sliding guide member 96. Located in the center of the sliding guide member is a cavity 101 which recesses from an opening 99 in the front guide surface 98. The dimension of the opening is a minimum of ⅝ inches in height and 2¼ inches in breadth. The depth of the cavity 101 is a minimum of 3 inches. Recessed into the ends of each guide cylinder 100a and 100b are located threaded bolt receptacles 120 shown in FIG. 8 into which are received the tension adjusting bolts 116 which pass through the right and left vertical support appendages 112. These support appendages are located on the base member surface on a plane directly behind the front guide plates or appendages 104a and 104b at a distance which allows the insertion of the tension adjusting bolts 116 and tension springs 102 in the manner shown in FIG. 8. The tension springs 102 surround the tension adjusting bolts 116 and butt against the base of the vertical support appendage receptacle hole 114 on one end and against the threaded bolt receptacle inserts 120 on the other end. This creates a tension which allows the sliding guide member 96 and the cylinder guides 100a and 100b to slide in and out of the base member unit when pressure is applied inward on the front guide surface 98 and released. In the center of the base member unit is a bit protrusion cavity 107 which separates the base member vertical guides plate or appendages 104a from 104b. The shape of this cavity is such as to match identically the shape of the sliding guide member cavity 108 and align with it when the unit is assembled as shown in FIGS. 1 and 8. The aligned cavities 101 and 107 allow for the protrusion of a routing bit above and below its surface when the biscuit joiner unit is attached to the quick-change table platform work surface.

DESCRIPTION OF OPERATION

The base plate 14 is mounted to the router 12 by means of router attaching screws (not shown) supplied with the original stock router base plate and secured through the base plate recessed attachment screw holes 38. Once the base plate is attached to the router it need never be removed. The router with the attached base plate can now be used in the same method and manner as it would with the original router stock base plate. The base plate guide edge 35 serves as a guide in the same manner as the outside perimeter edge of a stock base plate and the work surface 37 guides across a workpiece surface when the router is used in an upright position. The base plate center insert plate 16 is mounted to the base plate 14 by setting the insert plate into the base plate center mounting opening 39 from the top so that the recessed mounting receptacle opening cutouts 47 sets down over the center insert mounting support tabs 48. The center insert plate 16 is then turned clockwise until the lock/release tab catch 46 engages the tab catch slot 54 in the insert plate. When the insert plate and base plate are mounted together, the center insert mounting support tabs 48 are engaged into the center insert recepticle slot 52. The insert plate is dismounted by pushing down on the tab release button 44 which is seated in the base plate receptacle hole 40. This bends the lock/release tab 42 down thus disengaging the lock/release tab catch 46 from the tab catch slot 54. The insert plate is rotated counter-clockwise and lifted out when the tab receptacle slot 52 clears the mounting support tabs 48. The center insert plate is removed when using shaping or routing bits which are larger in diameter than the bit protrusion hole 50. The center insert plate, when mounted, gives planer support when a workpiece is guided over it and against a bit protruding through the protrusion hole 50. When using the template guide bushing 20a, it is inserted into the bit protrusion hole 50 from the top so that it recesses into the hole and rests upon the receptacle support ridge 51.

The bushing is then secured by screwing on the locking nut 20b from the underside of the insert plate. The template guide bushing is used when routing or cutting with a template pattern which guides the bushing and protruding bit along the template pattern design. The template guide bushing can be used either with the router in an upright position where the router base plate is passed over a workpiece or in a reversed position as a table where the workpiece is passed across the router base plate.

The table platform 18 is mounted to the base plate by setting the table platform onto the base plate 14 so that the table platform mounting support tabs 30 slips into the base plate recessed mounting receptacle openings 34. The table platform is then rotated counter-clockwise until stopped by the mounting support tab stops 31. When the table platform and base plate are mounted together, the table platform mounting support tabs 30 are engaged in the recepticle slots 36. The table platform, when mounted with the base plate, can be used as a router table with the router in an inverted position either secured by a vertical support unit such as item #10 shown in FIG. 1, or when suspended in a recessed cavity of another table platform. Also, the table platform when mounted with the base plate, can be used with the router in an upright position which gives greater surface stability when passing the platform over a workpiece. The table platform is held in place in the base plate by the snugness of fit of the mounting support tabs 30 when engaged in the slotted tab receptacles 36 and by the pressure applied to the tab stops 31 created by the clockwise rotational torque of the router. The table platform is dismounted from the base plate simply by rotating the table platform clockwise and removed when the mounting support tabs 30 disengage from the recepticle slot 36.

A workpiece is conveyed across the table platform surface by means of the workpiece slide guide 26. The slide guide slide bar 56 sets into the table platform slide bar groove 28 which guides the slide guide across the table platform work surface in a set relationship to the router bit. The workpiece is held against the slide guide frontal surface 61 and butted against the adjustment slide bar end stop 68 as it is pushed across the table platform work surface and against a router bit. The rough coated anti-slide membrane 58 on the slide bar 56 and the slide guide frontal surface 61 help to hold a workpiece in place. The adjustment slide bar 62 determines the position of the workpiece in relation to the router bit by sliding the adjustment bar to a set position and securing in place by the tightening bolt and turn knob 66. This sets the limit to which a workpiece can engage a router bit.

The multi-adjustment split fence 22 attaches to the table platform work surface by means of the tightening bolts turn knobs 90a and 90b which protrude through the adjusting position slots 86a and 86b and engage in the threaded receptacle holes 32. The fence is adjusted forward and backward to a set position within the length of the adjustment slots 86a and 86b and secured in place by tightening the bolts 90a and 90b. With the fence secured, a workpiece is pressed against the front guide plates 74a and 74b as it is pushed across the table platform work surface and against the router bit which protrudes into the fence recessed bit clearance cavity 75. The position where the fence is secured on the table platform work surface determines the relationship of the router bit to the workpiece. The dimension of the bit clearance cavity is such that it allows for the use of the router bits up to 3½ inches in diameter. The front guide plates 74a and 74b, against which the workpiece is guided, are laterally adjustable and secured by the tightening screws 78. The front plates are adjusted within the length of the adjustment groove slots 77, and positioned so as to provide a minimum distance between the bit and front guide plates thereby providing a maximum guide surface for a workpiece as it passes against the router bit. The closer the guide surface is to the cutting surface of the bit, the better is the support, safety, and accuracy of the cut. The right base member of the fence 72a is adjustable forward and backward as it slides in the interlocking tab and slot slip joint 84a and 84b. The adjustment allows the right member to offset the left member within the length of the adjustment slot 88. The members are secured in position by the tightening bolt and turn knob 90c which protrudes through the adjustment slot and into the threaded receptacle 82. The offset adjustment compensates proportionately for the cut removed when reducing the thickness of a workpiece as it passes across a router bit. The workpiece is fed into a router bit along the left front guide plate 74b while the outfeed passes against the right front guide 74a plate positioned to equally compensate for the cut or thickness removed. When the table platform is used in an upright position where the platform passes over the workpiece, the attached fence acts as a guide which determines the position of cut of the router bit. Using the router table in this position provides for greater stability when shaping or routing large workpieces which are easier to handle if stationary. The fence also is provided with attaching screws 92 for securing an optional protector shield or saw dust vacuum system (neither shown).

The biscuit joiner unit 24 is secured to the table platform 18 by means of tightening bolts with turn knobs 118a and 118b which pass through the base member securing holes 110 and engage the threaded receptacle holes 32. A slotting bit (not shown) protrudes from the router into the bit protrusion opening 101 and 107. The height of the slotting bit is adjusted to a set position so as to slot a workpiece at a desired location when pressed against it. When the biscuit joiner is secured in place the tension adjusting bolts 116 are adjusted so that the slotting bit cutting surface sets behind the front planar surface of the front workpiece guide 98. This provides protection so that when a workpiece is set against the front guide surface the bit does not engage the workpiece until pressure is applied inward against the biscuit joiner unit. A workpiece is marked at a location where it is to be slotted. This mark is then aligned with the front surface workpiece guide alignment marks 122. There are three alignment marks each ¼" apart. The workpiece is aligned with a mark and pressure is applied inward against the workpiece and the front guide surface so that the sliding guide plate 96 slides into the base member 94 thus engaging the workpiece with the slotting bit. This is repeated at each guide mark thereby producing an elongated slot in the workpiece. The depth of the slot is controlled by the depth adjustment screws 124. The distance inward the sliding guide plate 96 travels is determined by the position at which the depth adjustment screws are set. With the depth adjustment screws turned fully inward in the front guide surface the clearance between the screw ends and the base member vertical slide guide plates or appendages 104a and 104b is the least thereby creating the minimum slot depth. When the screws are backed off the distance of travel of the slide guide plate 96 is increased thereby creating a deeper slot in the workpiece. There are three sizes of commercially available joining biscuits. They are #0—16 mm×47 mm, #10—20 mm×52 mm, and #20—24 mm×58 mm. With the adjustment depth screws turned fully inward, the slot created in the workpiece is cut for the #0 size. With the screws backed off four turns, the slot created in the workpiece is cut for the #10 size. With the screws backed off eight turns, the slot created in the workpiece is cut for the #20 size. When the inward pressure on the workpiece is released, after the bit and workpiece have engaged, the slide guide plate returns to its original position and the bit disengages from the workpiece. The biscuit joiner is mainly used to slot workpieces for the purpose of joining them together. The slots are cut into workpieces that are to be joined together at corresponding locations on the workpieces. Glue is then put into each slot cavity and then a biscuit of corresponding size is inserted. The two workpieces are then joined together so that the corresponding slots align and the workpieces are clamped together. As the glue dries, the biscuits expand filling the slot cavities thereby creating a bond that is almost impossible to separate.

It is apparent from the foregoing that the quick-change multi-purpose table platform and its attachments meet the aims and objectives previously presented. It is obvious that various modifications and adaptations of this device may be made without departing from the scope of the present invention.

I claim:

1. A multi-purpose quick-change work surface platform for use with a power tool comprising:

a substantially flat planar table platform having an opening through a work surface which opening has projecting from a peripheral edge a plurality of tabs, wherein each tab includes a raised end stop, wherein each tab protrudes into said opening on a plane parallel to but recessed below the work surface, and wherein adjacent tabs are separated by spaces; and a substantially flat planar tool base plate which attaches to a power tool and mounts within said table platform opening, wherein said tool base plate includes an opening for a tool member which protrudes from the power tool, wherein said tool base plate includes a plurality of circumferential recepticle slots recessed into a peripheral edge of said tool base plate, wherein a work surface of said tool base plate includes a plurality of cutout openings which communicate with said recepticle slots and are such that each of said tabs mounts within one of said cutout openings and is received into one of said recepticle slots upon inserting said tool base plate into the table platform opening and rotating the tool base plate, whereby said work surfaces are made coplanar and the power tool is secured to said table platform.

2. An apparatus as set forth in claim 1 wherein said tool base plate opening includes interlocking attachment means projecting from a peripheral edge into said tool base plate opening for engaging a separate insert plate.

3. An apparatus as set forth in claim 2 wherein said attachment means comprises a plurality of tabs, wherein each of said tabs protrudes into said tool base plate opening on a plane parallel to but recessed below said work surface and wherein adjacent tabs are separated by spaces.

4. An apparatus as set forth in claim 3 wherein said tool base plate opening is circular and wherein said insert plate includes an opening through a work surface through which said tool member protrudes.

5. An apparatus as set forth in claim 4 wherein said insert plate is circular and includes a circumferential recepticle slot recessed into a peripheral edge of said insert plate, wherein a bottom planar surface of said insert plate includes a plurality of cutout openings which communicate with said recepticle slot and are such that each of said tool base plate oponing tabs mounts within one of said cutout openings and is received into said receptical slot upon inserting said insert plate into said tool base plate opening and rotating said insert plate, whereby said work surfaces are made coplanar.

6. An apparatus as set forth in claim 5 wherein said tool base plate includes a lock and release means to secure said insert plate when mounted in said tool base plate opening and comprising:
a spring tab mechanism having a protruding stop catch, wherein said spring tab mechanism is secured at one end in a cooperating cavity recessed into a bottom planar surface of said tool base plate, and wherein said stop catch protrudes into said tool base plate opening; and
a catch slot cutout in said peripheral edge of said insert plate such that said stop catch engages in said catch slot thereby restraining the movement of said insert plate when mounted in said tool base plate opening.

7. An apparatus as set forth in claim 1 wherein said work surface of said table platform includes a plurality of threaded holes and guide and alignment grooves recessed into said work surface and dimensioned to accommodate the fastening of various attachments and the conveying of workpiece guides.

8. An apparatus as set forth in claim 7 wherein a biscuit joiner mechanism for cutting slots in a workpiece is adapted for attachment to said multi-purpose quick-change work surface platform when used in cooperation with an attached router with an affixed slotting bit, and comprising:
a base member which attaches to said work surface of said table platform wherein said base member includes an opening that recesses into said base member from a front edge surface and wherein said opening aligns over said tool base plate opening when said tool base plate is mounted to said table platform;
a guide member which includes a front guide surface for engagement by a workpiece, cooperating means wherein said guide member slidably mounts to said base member such that said guide member can slide into said base member when pressure is exerted inwardly against said workpiece abutted to said front guide surface, and an opening that recesses through said front guide surface and which aligns with said base member opening when said base member and guide member are mounted together;
a spring mechanism cooperating with said guide member and base member for returning said guide member to original mounted position on said base member when pressure is released from said workpiece;
an adjustment means whereby the inward movement of said guide member in said base member is limited according to present positions of said adjustment means; and
retaining means whereby said base member and guide member are retained together when mounted to each other.

9. An apparatus as set forth in claim 8 wherein said base member and guide member recessed openings are sufficient in expanse such to allow the protrusion into said openings and the engagement into a workpiece of a slotting bit to a size of 2½ inches in diameter.

10. An apparatus as set forth in claim 8 wherein said guide member opening is positioned such to allow the cutting surface of said slotting bit to project beyond said front guide surface when said guide member slides into said base member thereby engaging a workpiece when abutted to said front guide surface and when inward pressure is applied.

11. An apparatus as set forth in claim 10 wherein said front guide surface includes markings to indicate lateral distances in which a workpiece is to be moved in relation to said front guide surface, thereby determining the length of cut into said workpiece.

12. An apparatus as set forth in claim 8 wherein said cooperating means for slidably mounting said base member and guide member together comprise:
a pair of elongated cylinders projecting from a rear surface of said guide member and received into cooperating receptacles positioned in a first pair of appendages projecting at a 90° angle from a top planar surface of said base member; and
retaining bolts protruding through a second set of appendages positioned at a 90° angle on said base member top planar surface at a set distance behind said first pair of appendages and wherein each said retaining bolts is threadably received into an end of each elongated cylinder.

13. A multi-purpose quick-change work surface platform for use with a power tool comprising:
a substantially flat planar table platform having an opening through a work surface which opening has projecting from a peripheral edge a plurality of tabs, wherein each said tab includes a raised end stop, wherein each said tab protrudes into said opening on a plane parallel to but recessed below said work surface, and wherein adjacent tabs are separated by spaces; and
a substantially flat planar tool base plate which attaches to a power tool and mounts within said table platform opening, wherein said tool base plate includes an opening in which attachment means project from a peripheral edge into said opening for the engaging of a separate insert plate, wherein said tool base plate includes a plurality of circumferential recepticle slots recessed into a peripheral edge of said tool base plate, wherein a work surface of said tool base plate includes a plurality of cutout openings which communicate with said recepticle slots and are such that each of said tabs mounts within one of said cutout openings and is received into one of said recepticle slots upon inserting said tool base plate into said table platform opening and rotating said tool base plate, whereby said work surfaces are made coplanar and the power tool is secured to said table platform.

14. An apparatus as set forth in claim 13 wherein said attachment means comprises a plurality of tabs, wherein each of said tabs protrudes into said tool base opening on a place parallel to but recessed below said work surface and wherein adjacent tabs are separated by spaces.

15. A multi-purpose quick-change work surface platform for use with a power tool comprising:
   a substantially flat planar table platform having an opening through a work surface which opening has projecting from a peripheral edge a plurality of tabs, wherein each said tab includes a raised end stop, wherein each said tab protrudes into said opening on a plane parallel to but recessed below said work surface, and wherein adjacent tabs are separated by spaces; and
   a substantially flat planar tool base plate which attaches to a power tool and mounts within said table platform opening, wherein said tool base plate includes an opening in which a plurality of adjacent tabs separated by spaces protrudes from a peripheral edge into said opening on a plane parallel to but recessed below a work surface, wherein said tool base plate includes a plurality of circumferencial recepticle slots recessed into a peripheral edge of said tool base plate, wherein a work surface of said tool base plate includes a plurality of cutout openings which communicate with said recepticle slots and are such that each of said tabs mounts within one of said cutout openings and is received into one of said recepticle slots upon inserting said tool base plate into said table platform opening and rotating said tool base plate, whereby said work surfaces are made coplanar and said power tool is secured to said table platform.

* * * * *